United States Patent [19]
Hedderly

[11] Patent Number: 5,492,031
[45] Date of Patent: Feb. 20, 1996

[54] STEERING COLUMN TRANSMISSION SHIFTING ASSEMBLY

[75] Inventor: Gregory T. Hedderly, Livonia, Mich.

[73] Assignee: Ford Motor Company, Dearborn, Mich.

[21] Appl. No.: 414,819

[22] Filed: Mar. 31, 1995

[51] Int. Cl.$^6$ ................................................ B60K 20/06
[52] U.S. Cl. .................. 74/473 SW; 74/492; 200/61.27; 200/61.3; 70/186
[58] Field of Search ................ 74/473 SW, 104, 74/107, 492; 477/96, 99; 70/185, 245, 247, 252, 186; 200/61.27, 61.3

[56] References Cited

U.S. PATENT DOCUMENTS

| | | | |
|---|---|---|---|
| 3,940,958 | 3/1976 | Kuroki | 70/186 |
| 4,733,573 | 3/1988 | Kramer | 74/473 |
| 4,888,456 | 12/1989 | Suzuki | 200/61.3 X |
| 5,003,132 | 3/1991 | Lagier | 200/61.27 X |
| 5,016,454 | 5/1991 | Al-Sheikh | 70/252 X |
| 5,430,265 | 7/1995 | Beattie et al. | 200/61.27 X |

Primary Examiner—Charles A. Marmor
Assistant Examiner—Saul Rodriguez
Attorney, Agent, or Firm—Gregory P. Brown; Roger L. May

[57] ABSTRACT

A steering column assembly includes a shift socket which is concentrically mounted on the steering column shaft, and includes a helical slot. A follower on a pivotable shift lever cooperates with the helical slot to pivot the shift lever as the shift socket is rotated. Accordingly, rotation of the shift socket causes movement of the shift lever, which translates the transmission shift cable for shifting the transmission. A single lock paw simultaneously locks both the shift socket and the steering column shaft from rotational movement.

15 Claims, 9 Drawing Sheets

STEERING COLUMN TRANSMISSION SHIFTING ASSEMBLY

TECHNICAL FIELD

The present invention relates to vehicle steering column assemblies, and more particularly to transmission shifting assemblies for steering columns.

BACKGROUND OF THE INVENTION

Traditionally, steering column assemblies include a variety of different components for locking the shifter and steering column shaft, and for translating rotational motion of the shift lever to longitudinal motion of the transmission shift cable. This variety of components can cause packaging and weight problems in the assembly, as well as increasing manufacturing costs.

Nothing in the prior art teaches using a single locking mechanism for simultaneously locking both the steering column shaft and the shift lever. Rather, these prior art assemblies include a first device for locking the steering column shaft and a second device for locking the shift lever. This results in a packaging problem.

Transmission shift cable actuation causes another packaging problem in prior art assemblies. Traditionally, a shift tube is connected to the shift lever and is positioned parallel to the steering shaft. The shift tube is rotated by the shift lever, and includes an attachment arm extending from the lower end of the tube. The attachment arm actuates the transmission shift cable for gear shifting. The sweeping movement of the attachment arm, as well as the shift tube positioning, consumes a large amount of space in the assembly.

SUMMARY OF THE INVENTION

The present invention contemplates providing a compact transmission shifting and locking assembly which is robust and avoids the above referenced problems of the prior art.

The present invention further contemplates providing a steering column assembly which is inexpensive to manufacture and translates rotational movement of the shift lever to longitudinal movement of the transmission cable without unduly consuming a large area within the assembly.

The present invention addresses problems experienced in prior art assemblies by providing a shift socket which is concentrically mounted on the steering column shaft and includes a helical slot which engages a follower for translating rotational movement of the shift lever to longitudinal movement of the transmission shift cable. A single lock paw simultaneously locks both the shift socket and the steering column shaft from rotational movement.

The present invention provides a shifter assembly for a vehicle having a transmission and a steering column assembly including a steering column shaft. The shifter assembly comprises a shift socket adapted to be mounted concentrically on the steering column shaft. The shift socket includes a helical slot. A shift lever is operatively connected to the shift socket for rotating the shift socket. A transmission selector arm is pivotally mounted to the steering column assembly. A follower is secured to the selector arm for cooperation with the helical slot. A transmission shift cable is connected to the selector arm. Rotation of the shift socket moves the follower along the helical slot to cause the selector arm to pivot, thus moving the shift cable for shifting the transmission.

The present invention also contemplates a vehicle steering column assembly including a steering column shaft and a shift socket mounted concentrically on the shaft. The shift socket includes a helical slot. A shift lever is connected to the shift socket for rotating the shift socket. A tilt head rotatably supports the steering column shaft. A transmission selector arm is pivotally mounted to the tilt head. A follower is secured to the selector arm for cooperation with the helical slot. A transmission shift cable is secured to the selector arm. Rotation of the shift socket moves the follower along the helical slot to cause the selector arm to pivot, thus moving the shift cable.

These objects and other objects, features and advantages of the present invention are readily apparent from the following detailed description of the best mode for carrying out the invention when taken in conjunction with the accompanying drawings.

DETAILED DESCRIPTION OF THE PREFERRED EMBODIMENTS

Figure 1:
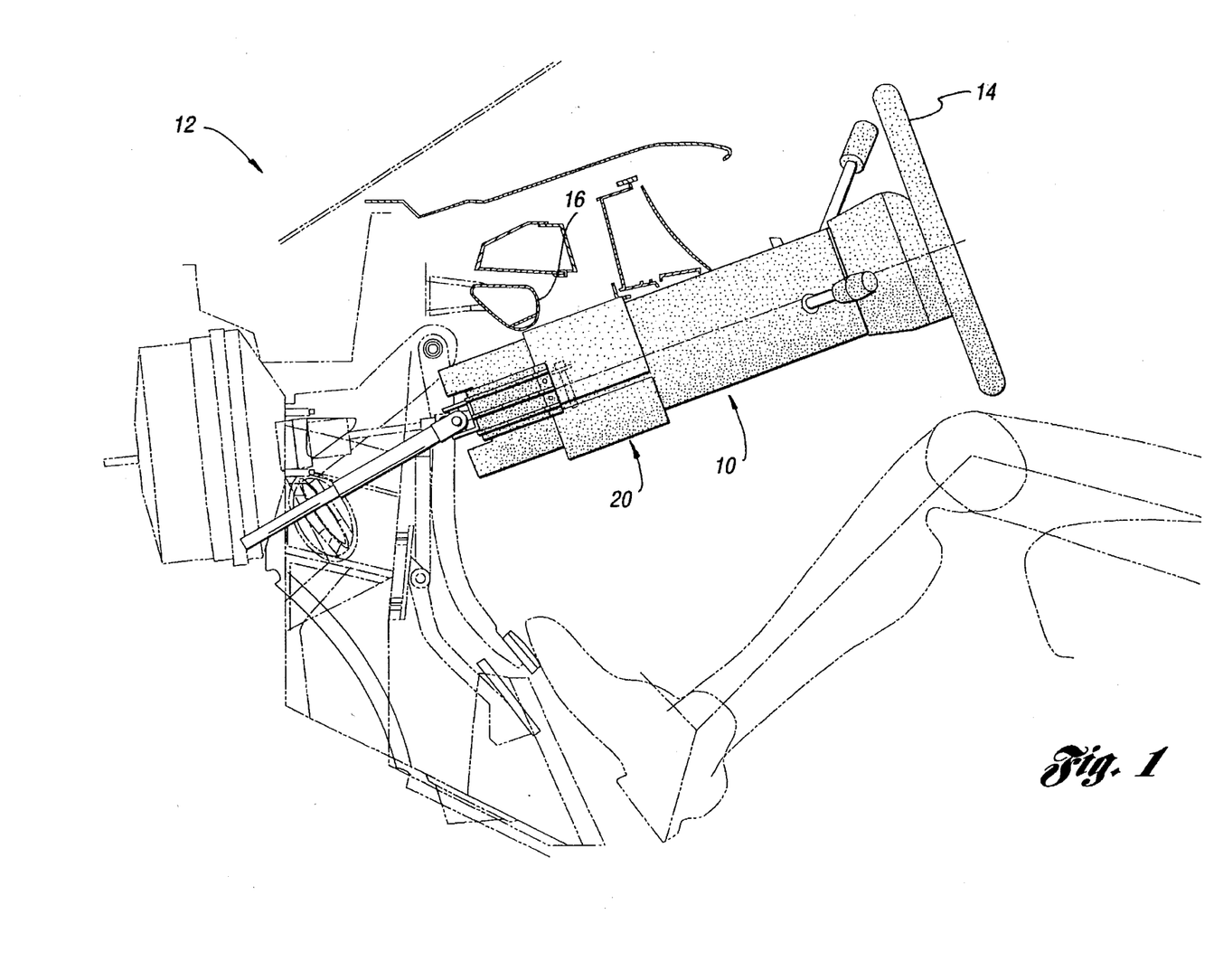
FIG. 1 shows a side view of a steering column assembly in a vehicle in accordance with the present invention.

FIG. 1 shows a modular main housing assembly 10 installed in a vehicle 12 in accordance with the present invention. The modular main housing assembly 10 supports a steering wheel 14, and is slidably supported by the receiver 20. The receiver 20 is rigidly supported in the vehicle by a cross-car beam 16.

The receiver 20 acts as a locator for the modular main housing assembly 10, and it guides the assembly as the steering column is being telescoped. The receiver 20 also guides the main housing assembly 10 in a high-energy impact. The receiver 20 reacts to peak loads in daily use, and also supports all loads applied to the steering wheel 14 in a high-energy impact. It also provides means for optimally cushioning ride-down and energy dissipation in a high-energy impact.

Figure 2A:
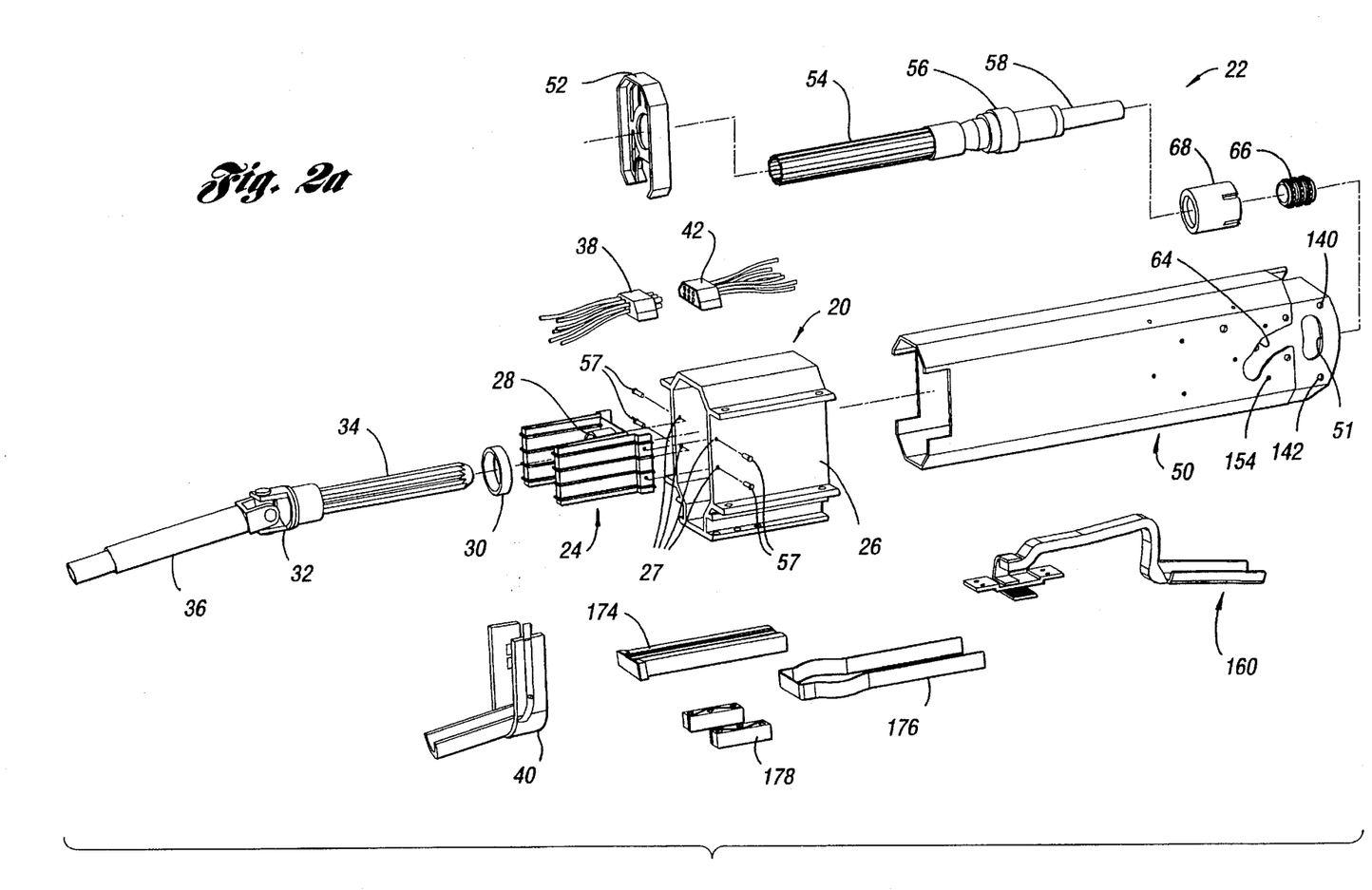
FIG. 2a shows an exploded perspective view of components of a steering column assembly in accordance with the present invention.
Figure 2B:
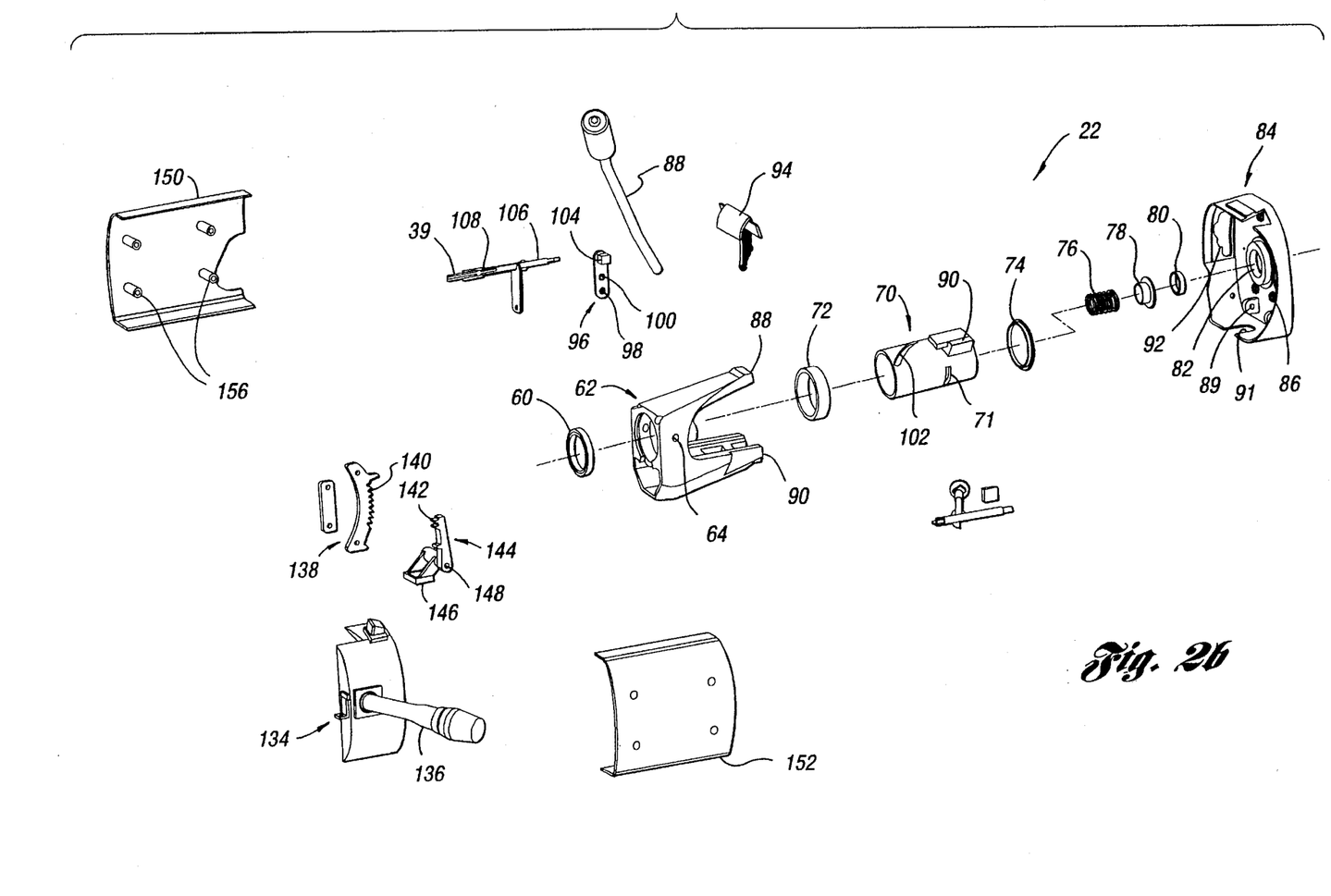
FIG. 2b shows an exploded perspective view of components of a steering column assembly in accordance with the present invention.

FIGS. 2a and 2b show exploded perspective views of portions of the steering column assembly 22. The modular steering column assembly 22 includes the receiver 20 which is mounted on a cross car beam in a vehicle. A lower bearing retainer 24 is secured to the sidewalls 26 of the receiver 20 at the mounting holes 27 by the rivets 57. The lower bearing retainer 24 has a central aperture 28 formed therethrough for receiving the lower bearing 30. The lower bearing 30 rotatably supports the lower universal joint 32. A lower steering column shaft 34 and a collapsible intermediate shaft 36 are connected to the lower universal joint 32.

Prior to installation of the modular main housing assembly 10, the receiver 20, lower bearing retainer 24, lower bearing 30, lower electrical connector 38, lower transmission cable 39, and lower steering column shaft 34 are in position to receive the modular main housing assembly 10. The lower steering column shaft 34, lower transmission cable 39, and the lower electrical connector 38 are supported by the reusable installation tool 40.

The modular main housing assembly 10 includes a telescope housing 50 for mating with the receiver 20. For installation, the upper steering column support 52 supports the upper steering column shaft 54, which is positioned within the telescope housing 50, for telescopic mating with the lower steering column shaft 34. The upper steering column shaft 54 is connected to an upper universal joint 56, which includes a tilt shaft 58 connected thereto at the opposite end. The upper universal joint 56 is supported by the upper bearing 60 in the tilt head 62. The tilt head 62 is pivotally connected to the telescope housing 50 at the pivot joint 64.

A retainer ring 66 rigidly secures the lock collar 68 to the tilt shaft 58 above the upper universal joint 56. The shift socket 70 is disposed concentrically about the tilt shaft 58, and is rotatably supported by the bearings 72,74. This arrangement is more clearly shown in FIG. 3b. The spring 76 biases the support cap 78 against the bearing 80. The bearing 80 rotatably supports the upper portion of the tilt shaft 58 within the aperture 82 formed in the tilt plate 84. The tilt plate 84 is secured to the tilt head 62 by screws extending through the apertures 86 in the tilt plate 84 and into the upper ends 88,90 of the tilt head 62.

The gear shift lever 88 is secured to the shift socket 70 by the jaws 90. The gear shift lever 88 is secured in desired PRNDL positions by the detent arrangement 92 in the tilt plate 84. The position of the lever 88 is displayed on the PRNDL member 94.

Figure 5:
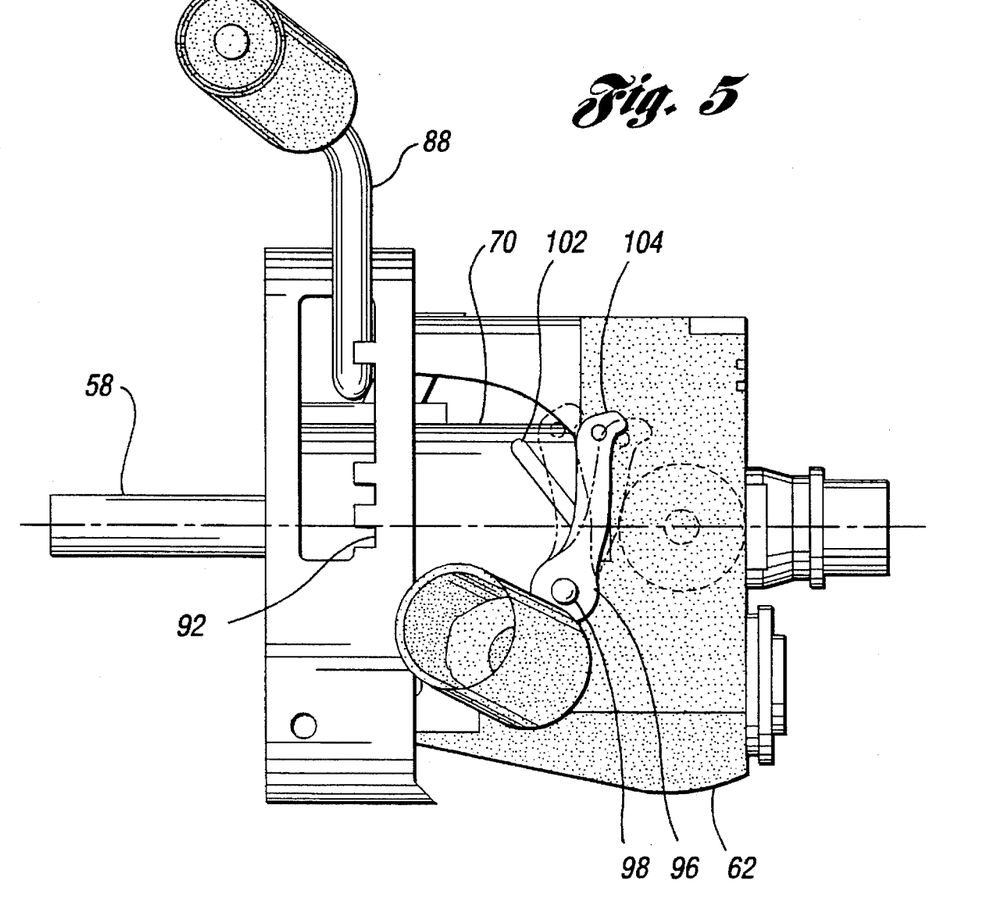
FIG. 5 shows a partially cutaway side view of the upper portion of a steering column assembly in accordance with the present invention.
Figure 6:
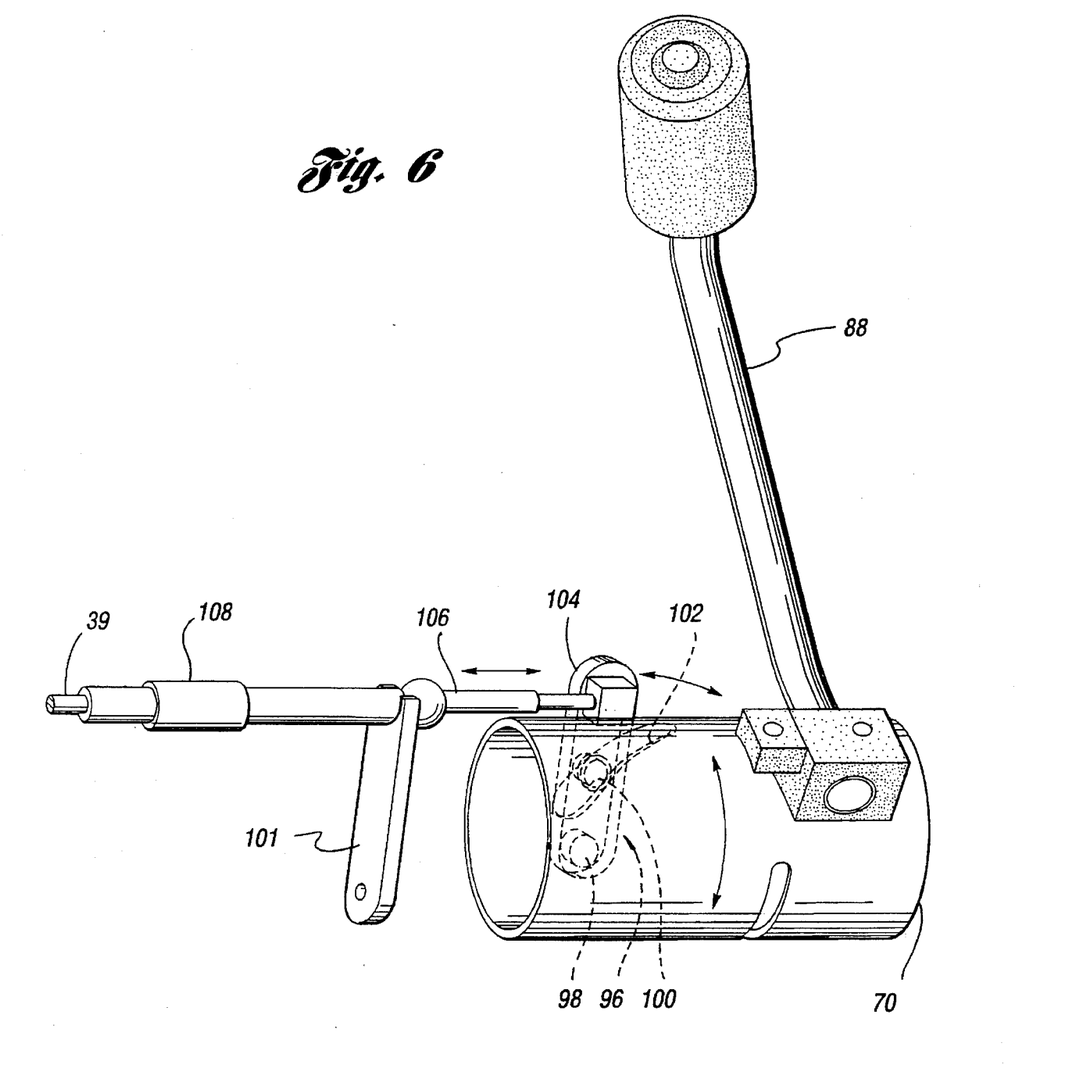
FIG. 6 shows a perspective view of a shift socket and transmission cable assembly in accordance with the present invention.

Referring to FIGS. 5 and 6, movement of the gear shift lever 88 within the detent arrangement 92 from one shift position to another causes rotation of the shift socket 70 about the tilt shaft 58. A selector arm 96 is pivotally mounted to the tilt head 62 at the pivot joint 98. The selector arm 96 includes a guide pin 100, which engages the helical slot 102 formed in the shift socket 70 (see FIG. 2b). The distal end 104 of the selector arm 96 is connected to the upper transmission cable 106. The upper transmission cable 106 includes a mating plug 108 for mating with the lower transmission cable 39, which leads to the transmission. The lower transmission cable 39 is guided into and secured to, as by a sawtooth connection, the transmission mating plug 108 when the modular main housing assembly 10 is inserted into the receiver 20. The bracket 101 (shown in FIG. 6) is secured to the tilt head 62 to support the transmission cable 106.

Rotation of the shift socket 70 by the gear shift lever 88 causes the follower 100 to travel along the helical slot 102 formed in the shift socket 70. The selector arm 96 then pivots about the pivot joint 98 as the follower 100 travels in the helical slot 102. Accordingly, the distal end 104 of the selector arm 96 is moved axially along the tilt shaft 58. The distal end 104 of the selector arm 96 is connected to the transmission cable 106, so that rotation of the shift socket 70 translates into linear movement of the transmission cable 106. In this manner, transmission gears are selected by movement of the shift lever 88, which translates into linear movement of the transmission cable 106.

Figure 4:
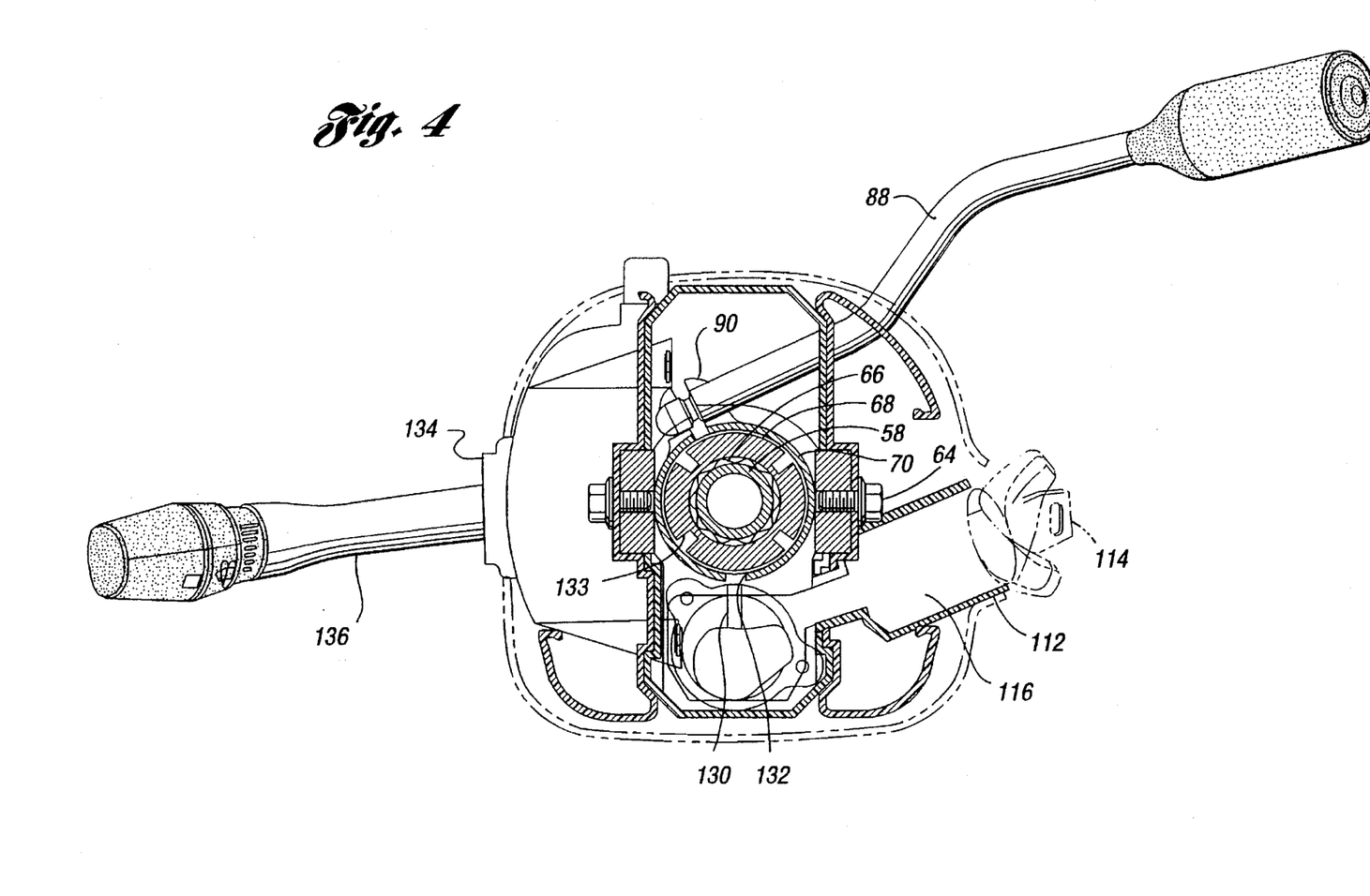
FIG. 4 shows a schematic sectional view of a steering column assembly in accordance with the present invention.
Figure 7:
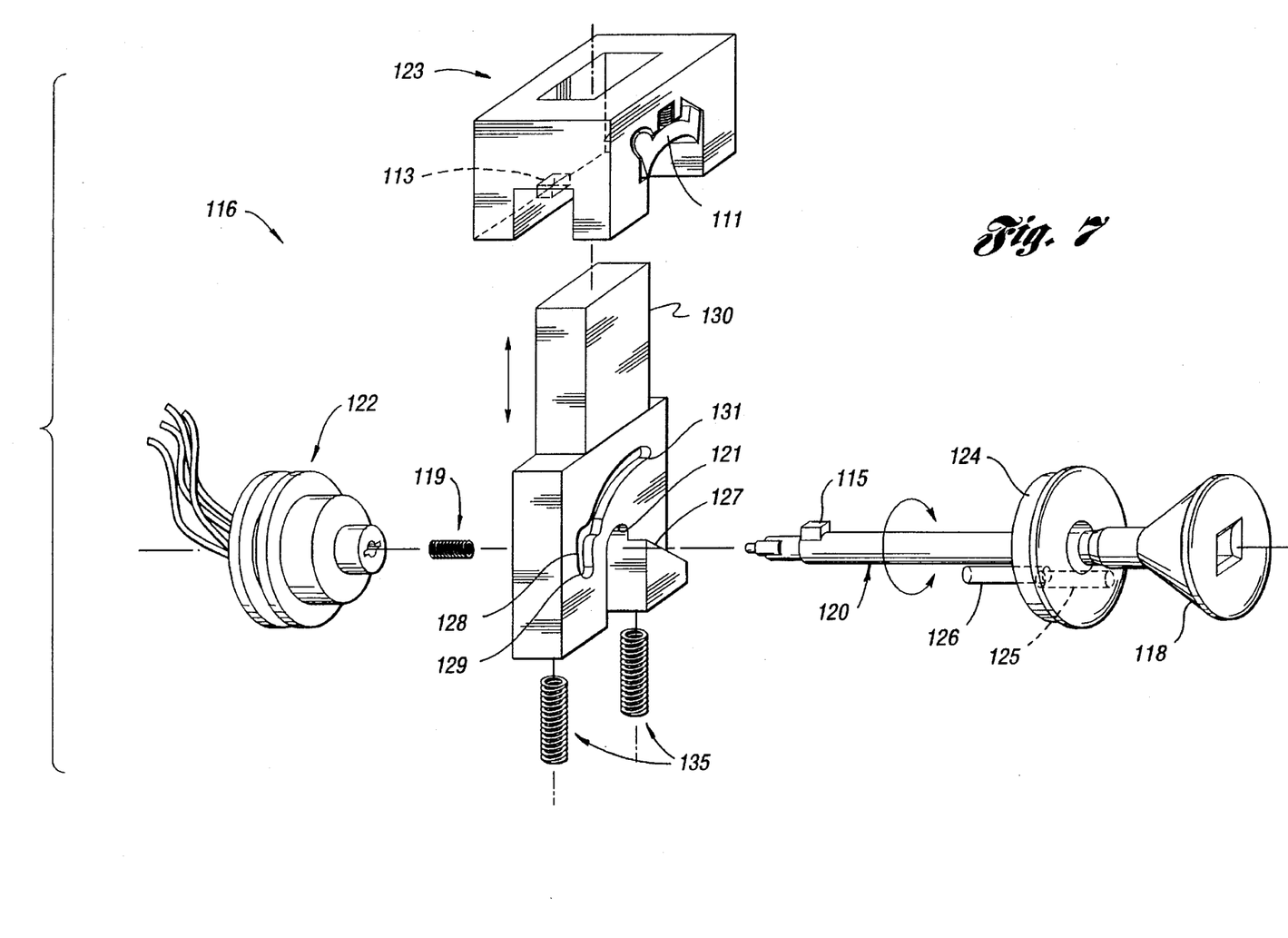
FIG. 7 shows an exploded perspective view of a conceptual shift socket locking mechanism in accordance with the present invention.

Referring to FIG. 4, the ignition housing 112 is integral with the tilt head 62. Rotation of the key 114 actuates the ignition mechanism 116 (FIG. 7). FIG. 7 conceptually shows a perspective exploded view of the ignition mechanism 116. Rotation of the ignition key causes rotation of a lock barrel (not shown), which rotates the intermediate member 118. The intermediate member 118 drives the ignition shaft 120. The ignition shaft 120 passes through the slot 121 in the lock paw 130, and engages with the ignition switch 122 for starting the vehicle engine. The lock paw 130 is movable through the paw support 123 for engagement with the lock slots 132, 133 (FIG. 4). Upward movement of the lock paw 130 engages the lock paw in the slots 132,133, and downward movement disengages the lock pawl 130 from the slots 132,133.

The ignition shaft 120 includes a disk 124 with first and second pins 125,126 mounted thereon. The first pin 125 engages the ramped surface 127 on the lock paw 130, and the second pin 126 travels in the slot 128 in the lock paw 130. When the key is rotated clockwise, the first pin 125 moves along the ramped surface 127 to force the lock paw 130 downward. As the first pin 125 travels along the ramped surface 127, the second pin 126 moves from the lower portion 129 of the slot 128 toward the upper portion 131 of the slot. Once the first pin 125 has traveled beyond the end of the ramped surface 127, the second pin 126 has reached the middle area of the slot 128, and begins to positively move the lock paw 130 downward as the second pin 126 travels toward the upper portion 131 of the slot. Counterclockwise rotation of the key causes the second pin 126 to return toward the lower portion 129 of the slot. The lower portion 129 of the slot is wider than the upper portion 131 so that there is only limited positive engagement with the second pin 126. The springs 135 bias the lock paw 130 upward toward a position of engagement with the locking slots 132,133 as the second pin 126 travels in the lower portion 129 of the slot 128.

The slot 128 and pin configuration 125,126 require the driver to move the shift socket to the "park" position prior to rotating the key counterclockwise. Counterclockwise rotation of the key causes the second pin 126 to force the upper portion 131 of the slot 128 upward, which causes the top of the lock paw 130 to abut against the shift socket 70, thus preventing counterclockwise rotation of the key when not in "park". If the shift socket 70 is in the "park" position, the lock paw 130 travels through the locking slot 132, thus allowing counterclockwise rotation of the key.

In a theft situation, the theft spring 119, which is secured to the ignition shaft 120, allows the ignition shaft 120 to disengage the ignition switch 122. The nub 115 on the ignition shaft engages the detent 113 on the pawl support 123 to prevent removal of the ignition shaft. If a thief attempted to return the disk 124 into the pawl support 123, the blocker 111 would drop down and prevent such movement.

When the shift lever 88 is in the park position, the upward spring bias of the lock paw 130 causes the lock paw 130 to engage one of the slots 133 formed in the lock collar 68 if the tilt shaft 58 is rotated sufficiently to cause alignment between the shift socket locking slot 132 and one of the lock collar slots 133. In this manner, the lock paw 130 is engaged with both the shift socket 70 and the lock collar 68, thereby preventing movement of the shift lever 88, or rotation of the tilt shaft 58. Accordingly, the steering wheel 14 and shift lever 88 are prevented from rotation for theft prevention purposes.

Referring to FIGS. 2b and 4, a multi-function switch assembly 134 and blinker lever 136 are connected to the telescope housing 50. The multi-function switch assembly 134 includes a switch (not shown) which extends through the side opening 51 in the telescope housing 50 (shown in FIG. 2a). The switch further extends through the slot 71 in the shift socket 70 for engagement with the slots 133 formed in the lock collar 68. When the steering column is rotated in a direction opposite that of the blinker indicator, the switch engages with one of the slots 133 in order to cancel the blinker.

The lock collar 68 is sufficiently robust to survive torsional theft loads. It is located above the upper universal joint 56, and therefore unloads the upper universal joint so that the upper universal joint may be made less robust.

The tilt head 62 is pivotally mounted with respect to the telescope housing 50 for user adjustment of steering wheel height. The tilt head 62 may be secured in a desired angular position with respect to the telescope housing 50 by a bracket and paw assembly, shown in FIG. 2b. The tilt bracket 138 is secured to the telescope housing 50 at the apertures 140,142 formed in the telescope housing 50 (shown in FIG. 2a). The tilt bracket 138 includes a plurality of teeth 140 formed thereon for engagement with teeth 142 extending from the tilt lever 144. The tilt lever 144 is pivotally connected to the tilt plate 84 at the lever mounting holes 89 on the rear of the tilt plate 84. A thumb button 146 extends from the tilt lever 144 into a slot 91 formed in the bottom of the tilt plate 84. The driver may depress the thumb button 146 to pivot the tilt lever 144 about the joint 148 to disengage the tilt lever teeth 142 from the tilt bracket teeth 140. In this manner, the driver may adjust the tilt head 62 to a desired steering wheel position, and release the thumb button 146 to reengage the tilt bracket 138 and tilt lever 144.

The tilt bracket 138 is strategically located a substantial distance from the tilt head pivot joint 64 (FIG. 2b) in order to cause lesser reaction forces against the tilt bracket 138 as a result of the increased moment arm and resulting mechanical advantage. The tilt bracket 138 is secured to the telescope housing at the apertures 140,142 (FIG. 2a), a substantial distance from pivot joint 64. This allows the tilt bracket 138 to be a smaller and lighter component. Further, the tilt bracket orientation promotes engagement between the tilt lever teeth 142 and the tilt bracket 138 so the tilt head is prevented from breaking free in a high-energy impact. The pivot joint 148 of the tilt lever 144 forms an over-center configuration which causes the tilt lever to rotate forward and tend to stay engaged with the tilt rack 138. The teeth engagement forces actually increase in the presence of an impact load as a result of this configuration.

As shown in FIG. 2b, a pair of support shrouds 150,152 are connected to the telescope housing 50 at the shroud holes 154. Hollow bosses 156 extend from the rear of the support shrouds 150,152 into communication with the shroud holes 154. A plurality of screws secure the support shrouds 150, 152 to the telescope housing 50 through the hollow bosses 156 and shroud holes 154.

Figure 3A:
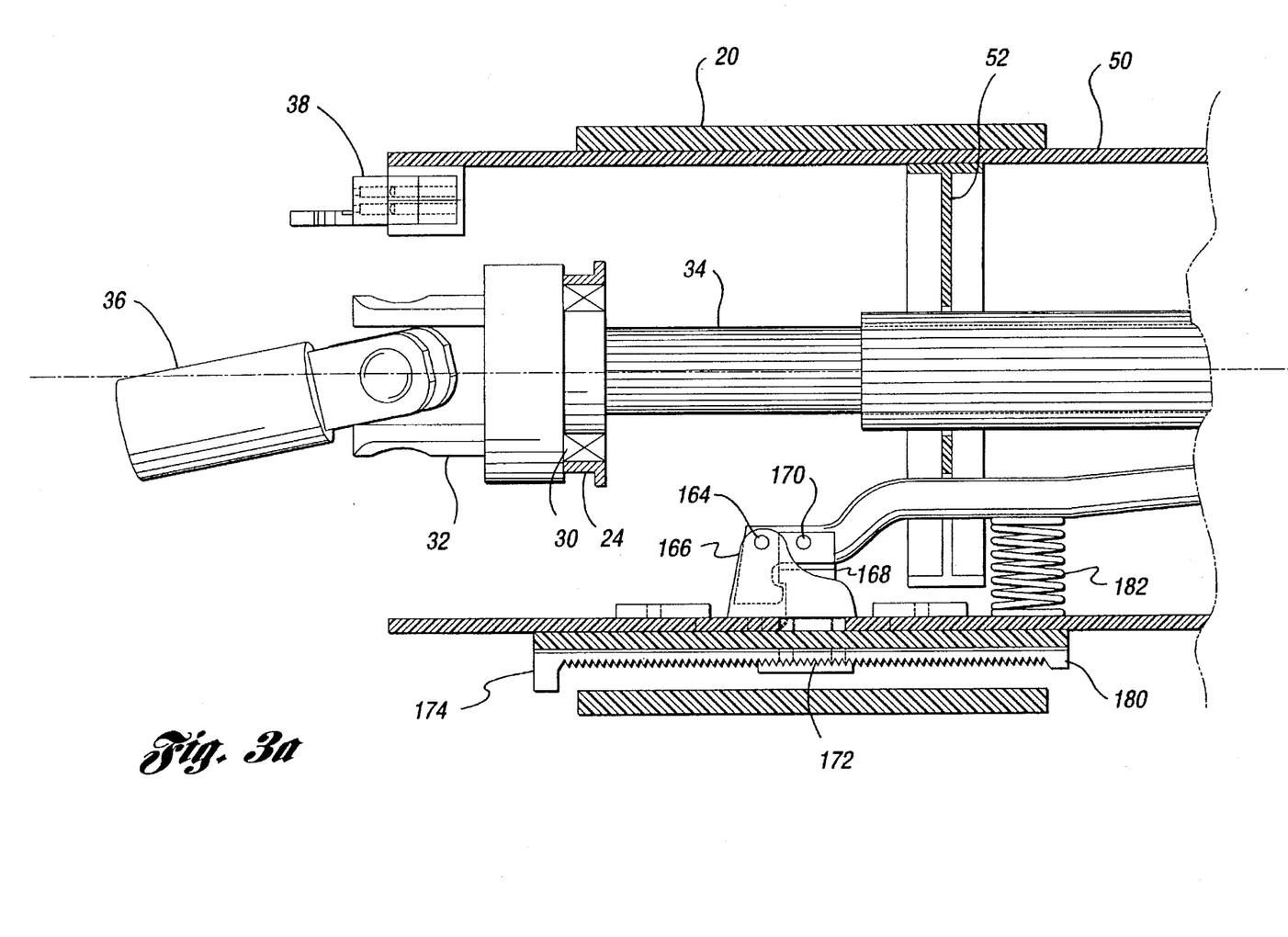
FIG. 3a shows a cutaway side view of the lower portion of a steering column assembly in accordance with the present invention.
Figure 3B:
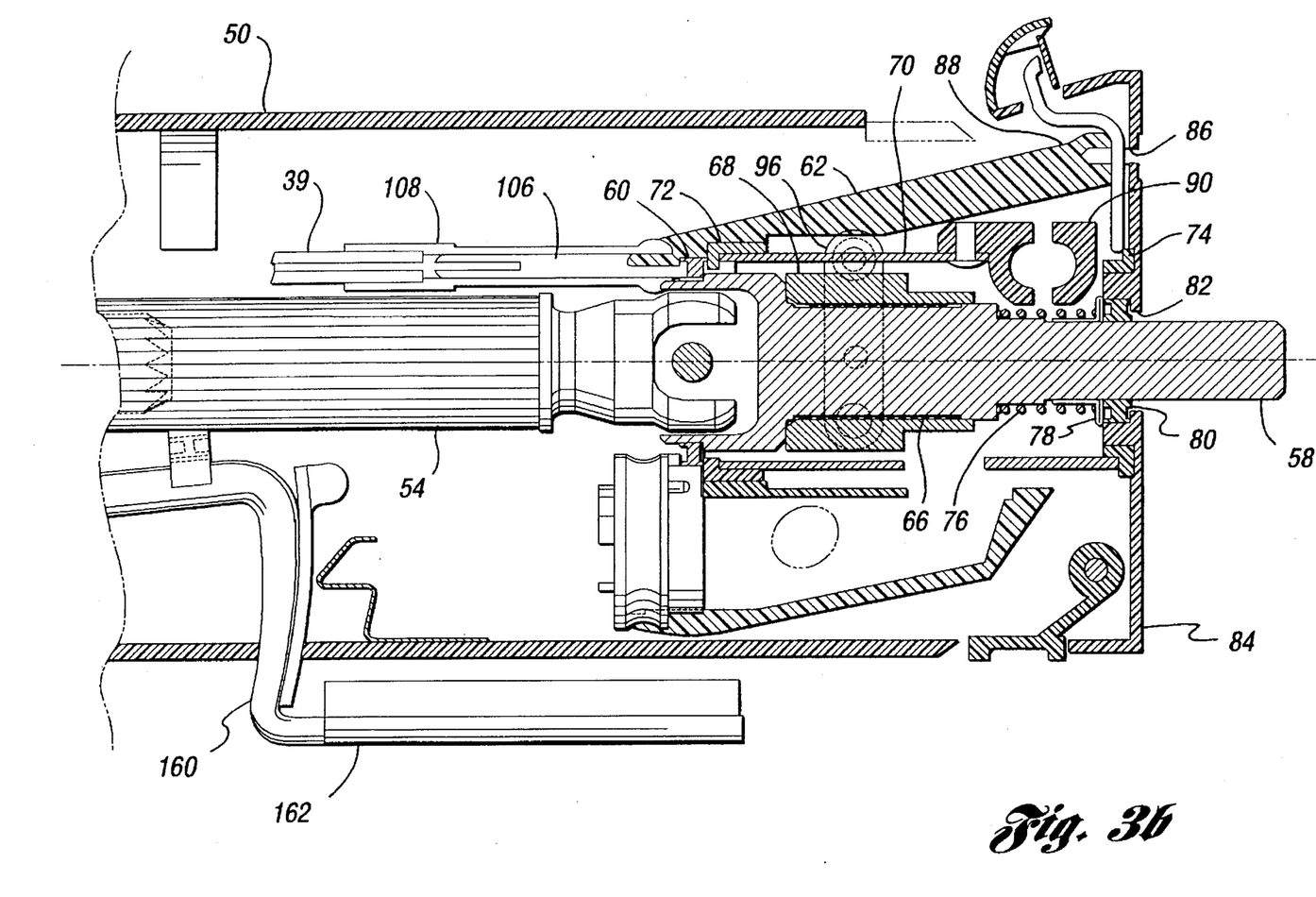
FIG. 3b shows a cutaway side view of the upper portion of a steering column assembly in accordance with the present invention.

Referring to FIGS. 3a and 3b, telescoping movement of the telescope housing 50 with respect to the receiver 20 is controlled by the lever 160. The lever 160 includes a handle 162 which extends below the telescope housing 50 for driver manipulation. The handle 160 is pivotally mounted to the telescope housing 50 at the pivot joint 164 through the bracket 166. The lever 160 is also pivotally mounted to a lock member 168 at pivot joint 170. The lock member 168 includes a plurality of teeth 172, which are engageable with the teeth of the rack 174. The rack 174 is connected to the receiver 20 by means of the energy absorption ribbon 176 and pegs 178. The telescoping travel of the telescope housing 50 is limited by the length of the rack 174. When the lock 168 reaches the end of the rack, no further movement can occur in that direction.

The configuration of the pivot joints 164,170 will cause the teeth of the lock member 168 and the teeth of the rack 174 to wedge more firmly together when force is exerted axially on the column. In a crash situation, the jaws will remain locked, and the telescope housing and rack will force the ribbons 176 through the pegs 178 to dissipate the driver's energy.

While the best modes for carrying out the invention have been described in detail, those familiar with the art to which this invention relates will recognize various alternative designs and embodiments for practicing the invention. Thus the above described preferred embodiment is intended to be illustrative of the invention which may be modified within the scope of the following appended claims.

What is claimed is:

1. A steering column shifter assembly for a vehicle having a transmission and a steering column assembly including a steering column shaft, the shifter assembly comprising:

a shift socket adapted to be mounted concentrically with respect to the steering column shaft, and having a helical slot formed therein;

a shift lever operatively connected to said shift socket for rotating said shift socket between a park position and at least one drive position;

a transmission selector arm having first and second portions, and pivotally mounted at said first portion with respect to the steering column assembly;

a follower secured to said selector arm for cooperation with said helical slot; and a transmission shift cable secured to said second portion of said selector arm;

whereby rotation of said shift socket moves said follower along said helical slot to cause said selector arm to pivot, thus moving said shift cable for shifting the transmission.

2. The steering column shifter assembly of claim 1, further comprising:

a locking slot formed in said shift socket;

an ignition shaft mounted to the steering column assembly;

a lock member selectively actuated by said ignition member for cooperation with said locking slot to prevent rotation of said shift socket when said shift lever is in the park position.

3. The steering column shifter assembly of claim 2, further comprising a spring for biasing said lock member toward said shift socket.

4. The steering column shifter assembly of claim 2, further comprising an ignition switch engaged with said ignition shaft for actuation.

5. The steering column shifter assembly of claim 1, further comprising:
a lock collar secured concentrically with respect to the steering column shaft within said shift socket, and having a plurality of lock slots formed therein for selective communication with said locking slot in said shift socket to receive said lock member to prevent rotation of the steering column shaft.

6. The steering column shifter assembly of claim 5, further comprising:
a multi-function switch assembly secured to said steering column assembly.

7. The steering column shifter assembly of claim 1, wherein said follower comprises a roller pin.

8. A vehicle steering column assembly, comprising:
a steering column shaft;
a shift socket at least partially circumscribing the steering column shaft, and having a helical slot formed therein, said shift socket being rotatable between a park position and a plurality of drive positions;
a shift lever operatively connected to said shift socket for rotating said shift socket between said park position and at least one drive position;
a tilt head rotatably supporting said steering column shaft;
a transmission selector arm having first and second portions and pivotally mounted at said first portion to said tilt head;
a follower secured to said selector arm for cooperation with said helical slot; and
a shift cable secured to said second portion of said selector arm;
whereby rotation of said shift socket moves said follower along said helical slot to cause said selector arm to pivot, thus moving said shift cable.

9. The steering column shifter assembly of claim 8 further comprising:
a locking slot formed in said shift socket;
an ignition shaft mounted to the steering column assembly;
a lock member selectively actuated by said ignition member for cooperation with said locking slot to prevent rotation of said shift socket when said shift lever is in the park position.

10. The steering column shifter assembly of claim 9, further comprising a spring for biasing said lock member toward said shift socket.

11. The steering column shifter assembly of claim 10, further comprising an ignition switch engaged with said ignition shaft for actuation.

12. The steering column shifter assembly of claim 8, further comprising:
a lock collar secured concentrically with respect to the steering column shaft within said shift socket, and having a plurality of lock slots formed therein for selective communication with said locking slot in said shift socket to receive said lock member to prevent rotation of the steering column shaft.

13. The steering column shifter assembly of claim 12, further comprising:
a multi-function switch assembly secured to said steering column assembly.

14. The steering column shifter assembly of claim 8, wherein said follower comprises a roller pin.

15. A vehicle steering column assembly, comprising:
a steering column shaft;
a shift socket mounted concentrically with respect to the steering column and shaft, and having a helical slot formed therein, said shift socket being rotatable between a park position and at least one drive position;
a tilt head rotatably supporting the steering column shaft;
a transmission selector arm having first and second portions and pivotally mounted at said first portion to said tilt head;
a follower secured to said selector arm for cooperation with said helical slot;
a shift cable secured to said second portion of said selector arm;
whereby rotation of said shift socket moves said follower along said helical slot to cause said selector arm to pivot, thus moving said shift cable; and
a lock member for selectively simultaneously preventing rotation of both said shift socket and said steering column shaft.

* * * * *